US008407039B2

(12) United States Patent
Kim et al.

(10) Patent No.: US 8,407,039 B2

(45) Date of Patent: Mar. 26, 2013

(54) METHOD AND APPARATUS OF TRANSLATING LANGUAGE USING VOICE RECOGNITION

(75) Inventors: Yu Jin Kim, Seoul (KR); Won Ho Shin, Seoul (KR)

(73) Assignee: LG Electronics Inc., Seoul (KR)

(*) Notice: Subject to any disclaimer, the term of this patent is extended or adjusted under 35 U.S.C. 154(b) by 1003 days.

(21) Appl. No.: 12/414,015

(22) Filed: Mar. 30, 2009

(65) Prior Publication Data

US 2010/0036653 A1 Feb. 11, 2010

(30) Foreign Application Priority Data

Aug. 11, 2008 (KR) ........................ 10-2008-0078247

(51) Int. Cl.
*G06F 17/28* (2006.01)

(52) U.S. Cl. ............. 704/2; 704/3; 704/4; 704/5; 704/7; 704/8; 715/264

(58) Field of Classification Search .................. 704/2, 8, 704/251; 715/264
See application file for complete search history.

(56) References Cited

U.S. PATENT DOCUMENTS 5,329,609 A * 7/1994 Sanada et al. ................. 704/251
5,842,218 A * 11/1998 Robinson ............................. 1/1
6,085,162 A 7/2000 Cherny
6,385,602 B1 * 5/2002 Tso et al. .............................. 1/1
6,917,920 B1 * 7/2005 Koizumi et al. .............. 704/277
6,996,520 B2 * 2/2006 Levin ............................. 704/10
7,020,612 B2 * 3/2006 Tamura ......................... 704/275
2002/0046029 A1 * 4/2002 Tamura ......................... 704/251
2002/0198713 A1 * 12/2002 Franz et al. ................... 704/252
2004/0019487 A1 * 1/2004 Kleindienst et al. ....... 704/270.1
2005/0038662 A1 * 2/2005 Sarich et al. .................. 704/277
2005/0131673 A1 * 6/2005 Koizumi et al. .................. 704/2
2005/0288933 A1 * 12/2005 Nakamura et al. ............ 704/270
2006/0100871 A1 * 5/2006 Choi et al. .................... 704/254
2006/0173683 A1 * 8/2006 Roth et al. .................... 704/251
2007/0011133 A1 * 1/2007 Chang ............................... 707/1
2007/0016401 A1 * 1/2007 Ehsani et al. ..................... 704/9
2008/0235017 A1 * 9/2008 Satomura ...................... 704/246
2010/0057457 A1 * 3/2010 Ogata et al. ................... 704/235

FOREIGN PATENT DOCUMENTS

KR 20-0249965 Y1 11/2001
KR 10-2003-0059678 A 7/2003
KR 10-2006-0037228 A 5/2006
KR 10-2008-0069077 A 7/2008

* cited by examiner

*Primary Examiner* — David R Hudspeth
*Assistant Examiner* — Lamont Spooner
(74) *Attorney, Agent, or Firm* — Birch, Stewart, Kolasch & Birch, LLP

(57) ABSTRACT

The present invention relates to a method and apparatus of translating a language using voice recognition. The present invention provides a method of translating a language using voice recognition, comprising: receiving a voice input comprising a first language; acquiring at least one recognition candidate corresponding to the voice input by performing voice recognition on the voice input; providing a user interface for selecting at least one of the acquired at least one recognition candidate; and outputting a second language corresponding to the selected at least one recognition candidate, wherein the type of the user interface is determined according to the number of the acquired at least one recognition candidate, and an apparatus of translating a language using voice recognition for implementing the above method.

11 Claims, 15 Drawing Sheets

METHOD AND APPARATUS OF TRANSLATING LANGUAGE USING VOICE RECOGNITION

This nonprovisional application claims priority under 35 U.S.C. §119(a) on Patent Application No. KR 10-2008-0078247 filed in Republic of Korea on Aug. 11, 2008 the entire contents of which are hereby incorporated by reference.

BACKGROUND

1. Field

This document relates to translating a language using voice recognition. More particularly, this document relates to a method and apparatus of translating a language using voice recognition which allows a user to be efficiently provided with a desired translation result by providing various user interfaces according to a voice recognition result of a voice inputted from the user.

2. Related Art

Voice recognition technology is a technology for implementing a function that allows a computer to recognize a human voice. Recently, the voice recognition technology is being applied so that the existing text-input-based language translation system can be conveniently used in a portable situation. Particularly, in the U.S., there had been developed and commercialized a portable voice translation system for military purposes.

A conventional translation system only translates expressions of limited situations and contexts due to the limitations of language processing technologies. Thus, the translation system presumes limited situations that a user can experience and stores translation results of sentences which are useful for these situations. The conventional translation system classifies limited situations into categories by theme, such as 'travel', 'hotel', 'restaurant', 'transportation', etc., and stores several hundreds of useful expressions in each of the categories. Therefore, in the conventional translation system, in order for the user to input a desired expression, the user first has to select a category and then select his or her desired expression.

In the conventional translation system, the reason why a category is firstly selected is to reduce the number of candidates of expressions to be recognized and, as a result, to increase the recognition rate. That is to say, in a case where the user attempts to recognize among all the expressions stored in the translation system without selecting a category, if there is a number of similar expressions according to category, this increases the possibility of false recognition and has a negative effect on the processing speed of the system. Accordingly, the user has the inconvenience of having to know in advance which category his or her desired expression belongs to.

SUMMARY

According to a first aspect of the present invention, there is provided a method of translating a language using voice recognition, comprising: receiving a voice input comprising a first language; acquiring at least one recognition candidate corresponding to the voice input by performing voice recognition on the voice input; providing a user interface for selecting at least one of the acquired at least one recognition candidate; and outputting a second language corresponding to the selected at least one recognition candidate, wherein the type of the user interface is determined according to the number of the acquired at least one recognition candidate.

According to a second aspect of the present invention, there is provided a method of translating a language using voice recognition, comprising: receiving a voice input comprising a first language; outputting at least one category each including at least one recognition candidate corresponding to the voice input by performing voice recognition on the voice input; selecting one of the at least one category; outputting the at least one recognition candidate contained in the selected category; selecting any one of the outputted at least one recognition candidate; and outputting translation data corresponding to the selected recognition candidate and comprising a second language.

According to a third aspect of the present invention, there is provided a method of translating a language using voice recognition, comprising: receiving a voice input comprising a first language; acquiring at least one recognition candidate corresponding to the voice input by performing voice recognition on the voice input; providing a user interface for receiving one of expressions related to the voice input; receiving one of expressions related to the voice input through the user interface; outputting at least one recognition candidate related to the received expression; selecting any one of the at least one recognition candidate related to the received expression; and outputting translation data corresponding to the selected recognition candidate and comprising a second language.

According to a fourth aspect of the present invention, there is provided an apparatus of translating a language using voice recognition, comprising: a voice input unit for receiving a voice input comprising a first language; a voice recognition unit for acquiring at least one recognition candidate corresponding to the voice input by performing voice recognition on the voice input; a memory storing a plurality of user interfaces for selecting at least one of the acquired at least one recognition candidate and a database in which the first and second languages are matched with each other for each of a plurality of categories; and a controller for providing any one of the plurality of user interfaces according to the number of the acquired at least one recognition candidate, receiving a selection signal for at least one of the acquired at least one recognition candidate through the provided user interface, and outputting translation data comprising the second language corresponding to the selected at least one recognition candidate with reference to the database.

According to a fifth aspect of the present invention, there is provided a method of translating a language using voice recognition in an electronic device providing a voice recognition function and having a display, the method comprising: receiving a voice input comprising a first language and containing a plurality of words; acquiring a recognition candidate corresponding to the voice input by performing voice recognition on the voice input in units of words; displaying the recognition candidate on the display in such a manner as to distinguish a word having a confidence below a reference value among the plurality of words from the other words; changing the word having a confidence below a reference value into a new word; and replacing the word having a confidence below a reference value with a second language corresponding to the new word and displaying the second language corresponding to the recognition candidate on the display.

According to a sixth aspect of the present invention, there is provided a method of translating a language using voice recognition in an electronic device providing a voice recognition function and having a display, the method comprising: receiving a voice input comprising a first language and containing a plurality of words; and displaying translation data comprising a second language corresponding to the voice input by performing voice recognition on the voice input in units of words, wherein, in the displaying of translation data, a word comprising a second language corresponding to a word having a confidence below a reference value among the plurality of words is displayed distinguishably from the other words comprising the translation data.

According to a seventh aspect of the present invention, there is provided a method of translating a language using voice recognition in an electronic device providing a voice recognition function and having a display, the method comprising: (a) receiving a voice input comprising a first language; (b) acquiring translation data comprising a second language corresponding to the voice input by performing voice recognition on the voice input; (c) storing the translation data in a translation file upon receipt of a first preset command signal; and (d) repetitively performing steps (a) to (c) until a second preset command signal is received, wherein the translation data acquired each time steps (a) to (c) are repetitively performed is added and stored in the translation file.

According to the method and apparatus of translating a language using voice recognition of the present invention, the following effects can be obtained.

According to the present invention, it is possible to allow a user to be efficiently provided with a translation result of a language by providing different user interfaces in accordance with a result of voice recognition on a voice inputted from the user.

According to the present invention, it is possible to allow the user to be provided with a desired language translation result through a minimum search procedure by providing the user with a proper user interface even if there are a number of recognition candidates as a result of performing voice recognition.

According to the present invention, the user can easily and quickly find a language translation result even if he or she does not know the category his or her desired language translation result belongs to.

According to the present invention, in a case where the user cannot obtain a desired language translation result, recognition candidates and translation results acquired as a result of performing voice recognition can be corrected, thereby providing a user interface convenient for the user.

BRIEF DESCRIPTION OF THE DRAWINGS

The implementation of this document will be described in detail with reference to the following drawings in which like numerals refer to like elements.

DETAILED DESCRIPTION

Figure 1:
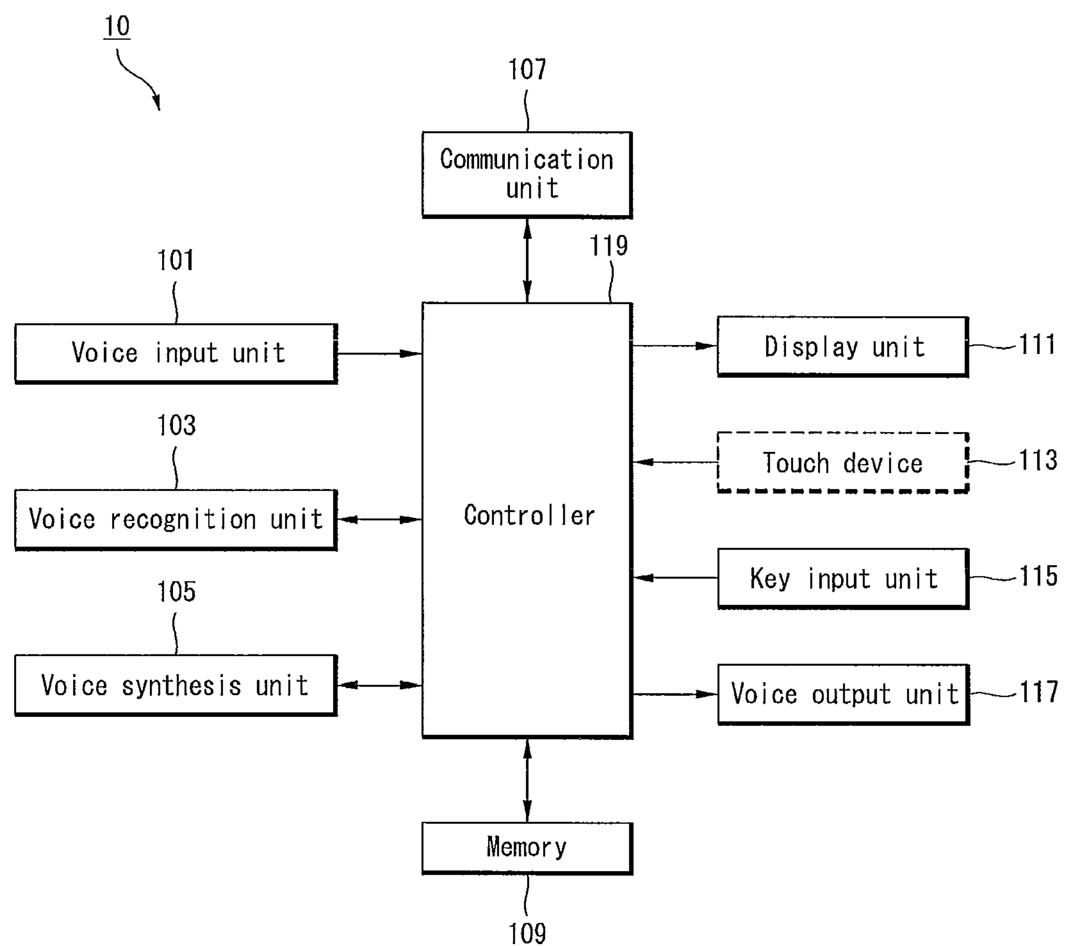
FIG. 1 is a block diagram of an apparatus of translating a language translating apparatus using voice recognition according to one embodiment of the present invention.

The above-mentioned objectives, features, and advantages will be more apparent by the following detailed description in association with the accompanying drawings. Hereinafter, embodiments of the present invention will be set forth in detail with reference to the accompanying drawings. It is to be noted that the same reference numerals are used to designate the same elements throughout the specification. In addition, detailed descriptions of known functions and configurations incorporated herein is omitted to avoid making the subject matter of the present invention unclear.

Voice recognition technology is an application of the pattern matching technique. That is, characteristic parameters of words or phonemes to be recognized are stored in advance, and, when a voice is inputted, the characteristics of the voice are extracted by analysis, the similarities to the characteristics of the stored words or phonemes are measured, and the most similar word or phoneme is outputted as a recognition result. As voice changes with time, the characteristics of voice are stable only during a short frame. Therefore, the characteristics of voice are analyzed for each frame to generate characteristic vectors, and are expressed in columns of these characteristic vectors.

Methods of voice recognition are roughly classified into two: 1) a voice recognition method in which a voice is regarded as a kind of pattern and the similarity between a registered pattern and an input pattern is measured for recognition; and 2) a voice recognition method in which a unique model is allocated to each target word or phoneme by modeling a voice production process and it is detected which voice model an input voice is most likely produced from. Besides, there are included a method using a nerve circuit network, a combination of various methods, etc. In addition to such a signal processing aspect, a language model containing knowledge information associated with a language system can be applied in the voice recognition method.

FIG. 1 is a block diagram of an apparatus of translating a language translating apparatus 10 using voice recognition according to one embodiment of the present invention. The apparatus of translating a language translating apparatus 10 using voice recognition according to one embodiment of the present invention comprises a voice input unit 101, a voice recognition unit 103, a voice synthesis unit 105, a communication unit 107, a memory 109, a display unit 111, a touch device 113, a key input unit 115, a voice output unit 117, and a controller 119.

The voice input unit 101 receives a user's voice signal. For example, the voice input unit 10 may correspond to a microphone (MIC).

The memory 109 stores a predetermined program for controlling the overall operations of the language translating apparatus 10, and is able to temporarily or permanently store data input and output when the controller 119 carries out general operation of the language translating apparatus 10 and various data processed by the controller 109.

The memory 109 may include a sound model, a recognition dictionary, and a translation database that are required for the operations of the present invention. Further, the memory 109 may include a language model.

The recognition dictionary may include at least one of words, phrases, keywords, and expressions comprising a specific language.

The translation database includes data which matches a plurality of languages with each other. For example, the translation database may include data which matches a first language (Korean) and a second language (English/Japanese/Chinese) with each other. The second language is a term used to discriminate it from the first language, and may be a plurality of languages. For example, the translation database may include data which matches a Korean sentence " . . . " with an English sentence "I'd like to make a reservation.".

The translation database can make the first language and the second language correspond to each other by categories. The categories may be by theme or by language. The categories by theme may include, for example, "general", "travel", "hotel", "flight", "shopping", "government offices" and so forth. The categories by language may include, for example, "English", "Japanese", "Chinese", "Spanish" and so forth.

The voice recognition unit 103 performs voice recognition on a voice signal inputted through the voice input unit 102, and acquires at least one recognition candidate corresponding to the recognized voice. For instance, the voice recognition unit 103 can recognize the inputted voice signal by detecting a voice section from the inputted voice signal, performs voice analysis, and then recognizing it in recognition unit. Next, the voice recognition unit 103 can acquire the at least one recognition candidate corresponding to a result of the voice recognition with reference to the recognition dictionary and translation database stored in the memory 109.

The voice synthesis unit 105 converts text into speech by using a TTS (Text-To-Speech) engine. The TTS technology is a technology for converting text information or symbols into human speech and reading them. In the TTS technology, a pronunciation database for all the phonemes of a language is built and the phonemes are connected to generate a continuous speech. At this moment, the amplitude, length, volume, etc. of the speech are adjusted to thus synthesize a natural speech. To this end, a natural language processing technology may be included. The TTS technology can be easily seen in the field of electronic communications, such as CTIs, PCs, PDAs, and mobile phones, and in the field of home appliances, such as recorders, toys, and game devices, and is widely used to contribute to the improvement of productivity in factories or widely used for home automation systems for more convenient everyday living. Since the TTS technology is a well-known technology, a detailed description thereof will be omitted.

The communication unit 107 connects to a wired or wireless network that exists outside the language translating apparatus 10 to send or receive data. For example, the communication unit 107 may include at least one of a broadcasting reception module for receiving a broadcasting signal from a broadcasting station, a mobile communication module capable of connecting to a mobile communication network and sending and receiving data, and a portable internet module capable of connecting to a portable internet network, such as WiBRO or WiMAX, and sending and receiving data. The recognition dictionary and translation database stored in the memory 109 can be updated through the communication unit 107.

The display unit 111 displays various information by a control signal outputted from the controller 119.

The touch device 113 is an input device capable of recognizing an external touch. For example, the user can input various information or commands by touching a certain spot of the touch device 113 with a finger or a stylus pen. The touch device 113 includes, for example, a touch pad, a touch screen, and the like. A device in which the display unit 111 and the touch device 113 are integrated with each other is generally referred to as a touch screen. A touch input to be mentioned in the present invention includes both a physical touch and a proximity touch.

The key input unit 115 is an input device including at least one key. The user can input various information and commands through the key input unit 115.

The voice output unit 117 is a device for outputting voice through a speaker. For example, the voice output unit 117 receives a voice signal from the voice synthesis unit 105 and outputs it.

The controller 119 controls the above-described components, and controls the overall operations of the language translating apparatus 10 according to the embodiments of the present invention.

Hereinafter, referring to the required drawings, a concrete operation of the language translating apparatus 10 using voice recognition according to the embodiments of the present invention and a method of translating a language using voice recognition according to the embodiments of the present invention will be described in detail. Hereinafter, the display unit 111 and the touch device 113 will be described as a touch screen 111 and 113 for convenience.

<Provision of User Interface According to Result of Voice Recognition>

Figure 2:
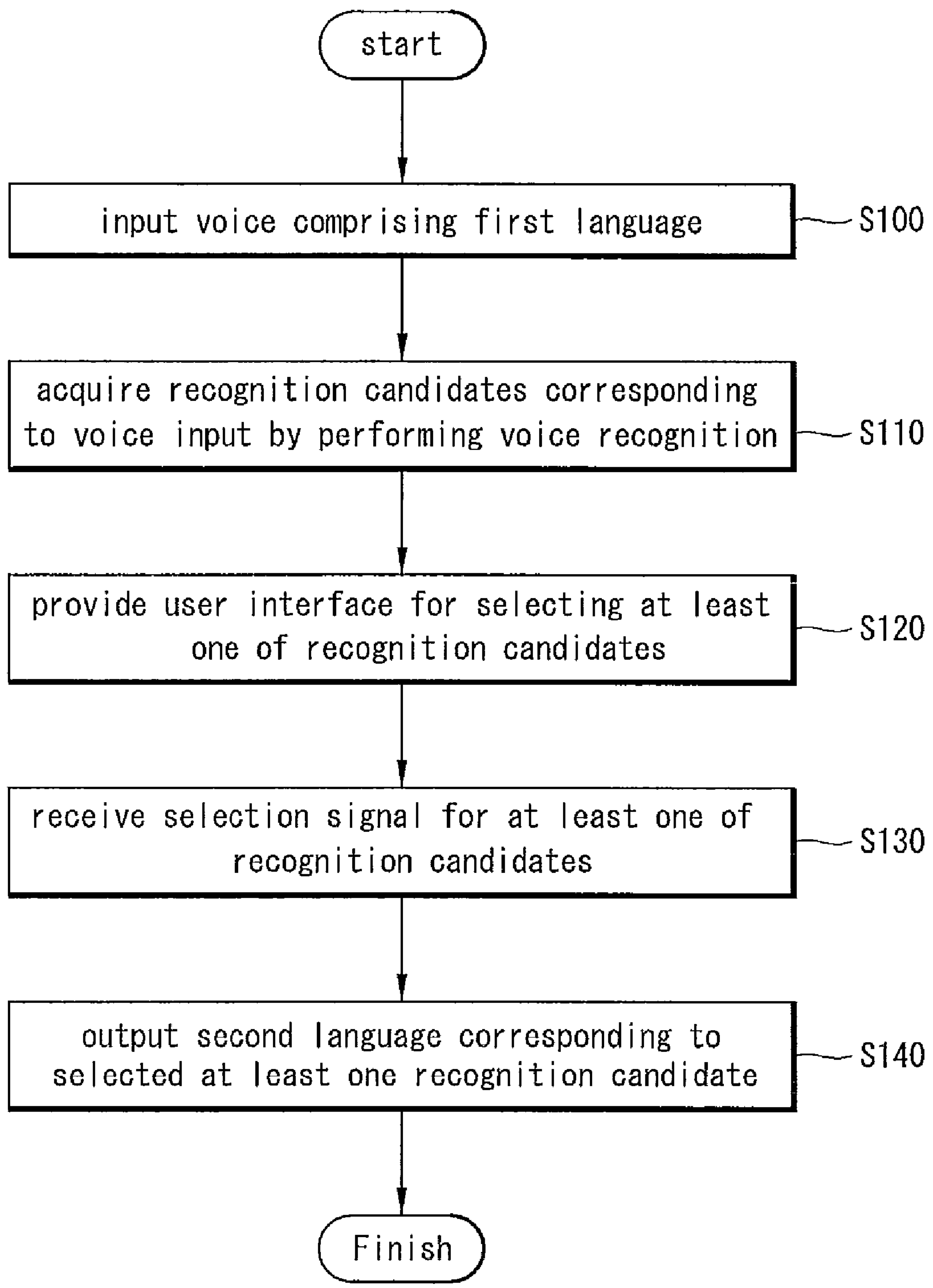
FIG. 2 is a flow chart of a method of translating a language using voice recognition according to a first embodiment of the present invention.

FIG. 2 is a flow chart of a method of translating a language using voice recognition according to a first embodiment of the present invention. The method of translating a language using voice recognition according to the first embodiment of the present invention can be carried out in the language translating apparatus 10 as shown in FIG. 1. Hereinafter, the method of translating a language using voice recognition according to the first embodiment of the present invention and a concrete operation of the language translating apparatus 10 for implementing the method will be described in detail.

First, a voice comprising a first language is inputted through the voice input unit 101 [S100]. For example, the user says " . . . (I'd like to make a reservation)" through a microphone provided in the language translating apparatus 10.

The controller 119 performs voice recognition on the voice input, and acquires at least one recognition candidate corresponding to the voice input [S110]. The controller 119 can acquire the at least one recognition candidate with reference to the recognition dictionary and translation database stored in the memory 109.

Figure 3:
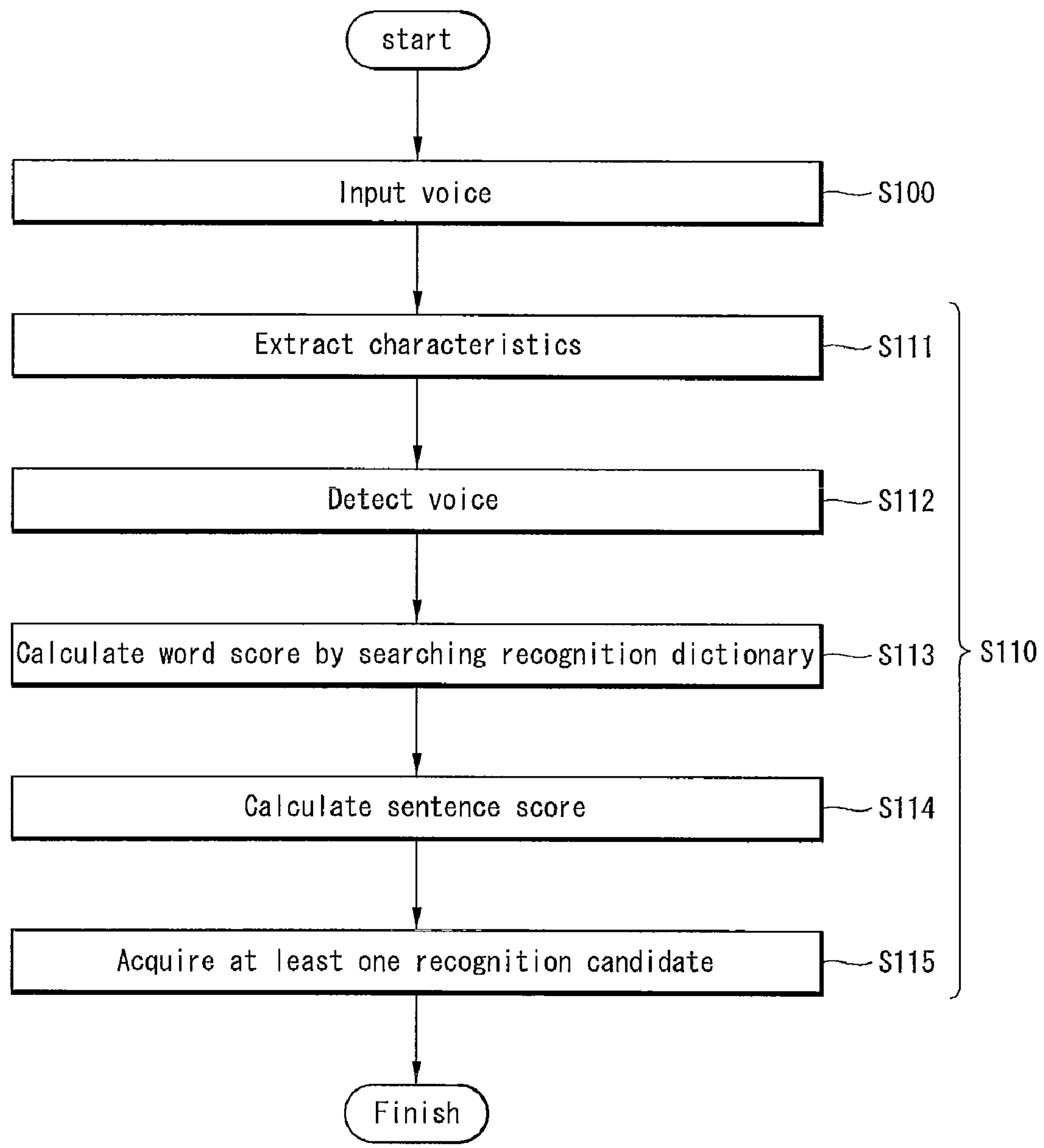
FIG. 3 is a detailed flow chart of step S110.

FIG. 3 is a detailed flow chart of step S110. The controller 119 extracts the characteristics of the voice input [S111], detects a voice [S112], and calculates a word score by searching the dictionary [S113]. In step S113, the words in the voice input that are registered in the recognition dictionary are searched for. Then, the controller 119 calculates a sentence score in order to find a sentence containing the words searched for in step S113 [S114]. In step S114, at least one sentence having a value higher than a preset score is acquired as the at least one recognition candidate [S115].

As stated above, the translation database can store the first language in categories by theme. In this case, the at least one recognition candidate acquired by performing the step S110 may belong to different categories, respectively.

The controller 119 provides a user interface for selecting at least one of the at least one recognition candidate acquired in step S110 [S120]. The type of the user interface may be determined according to the number of the acquired at least one recognition candidate.

The provision of a different user interface according to the number of the acquired recognition candidate in step S120 is to allow the user to easily select a desired recognition candidate among the acquired recognition candidates.

For example, if the number of the acquired recognition candidates is more than a reference value, the user interface may be the one for selecting a category. If the number of the acquired recognition candidates is too large, the provision of all these to the user may cause a great burden and inconvenience to the user. At this moment, if the user is allowed to select a specific category and only the recognition candidate belonging to the category selected by the user is provided to the user, the user can obtain a desired translation result quickly and conveniently. The case where a user interface for selecting a category is provided will be described in detail in a second embodiment of the present invention to be described later.

Furthermore, for example, if the number of the acquired recognition candidates is more than a reference value, the user interface may be the one for selecting one of expressions contained in the voice input. Like the case of selecting a category, if the user is allowed to select one of expressions and only the recognition candidate containing the expression selected by the user is provided to the user, the user can avoid the inconvenience of having to select a desired recognition candidate among too many recognition candidates. The case where a user interface for selecting one of expressions is provided will be described in detail in a third embodiment of the present invention to be described later.

Furthermore, for example, if the number of the acquired recognition candidate is less than a reference value, the user interface may be the one for allowing the user to directly select at least one recognition candidate among the acquired recognition candidates. In this case, as the number of the acquired recognition candidates is less than a reference value, even if the whole acquired recognition candidates are provided to the user, the user can select a desired recognition candidate without inconvenience.

The user interface may be provided, being coupled to various devices. For example, the user interface may be an interface using a touch screen or an interface using voice recognition.

The controller 119 receives a selection signal for at least one of the at least one recognition candidate acquired in step S110 [S113], and a second language corresponding to the at least one recognition candidate selected in step S130 is outputted [S140].

In step S140, the controller 119 may output the second language with reference to the translation database stored in the memory 109. Once step S140 is performed, a recognition candidate for translation is determined. Thus, the second language corresponding to the determined recognition candidate can be determined.

Outputting of the second language can be performed in various manners. For example, the controller 119 may display the second language on the display unit 111. Further, for example, the controller 119 may synthesize the second language into voice and then output the synthesized voice through the voice output unit 117 by controlling the voice synthesis unit 105.

<User Interface for Selecting Category>

Figure 4:
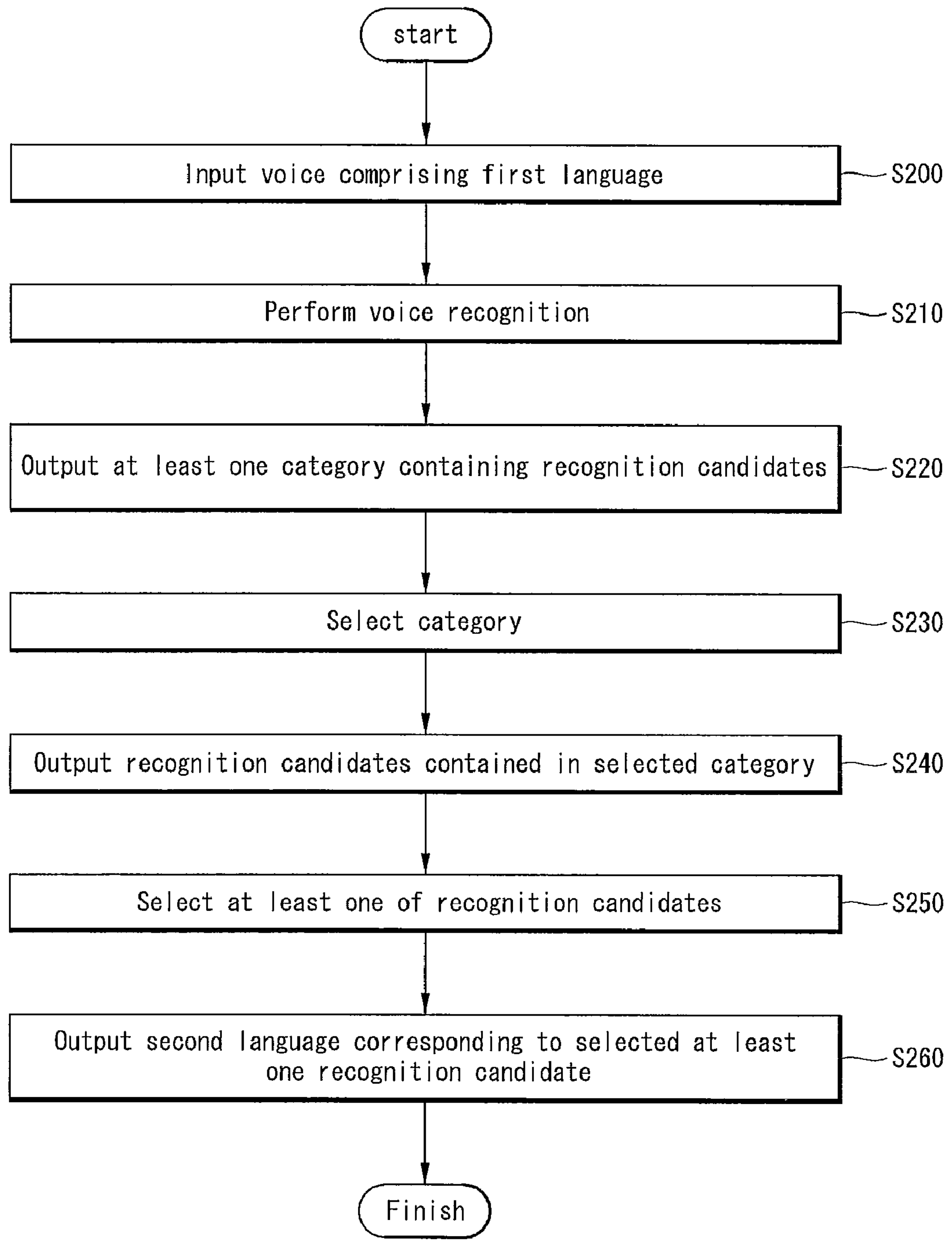
FIG. 4 is a flow chart of a method of translating a language using voice recognition according to a second embodiment of the present invention.
Figure 5:
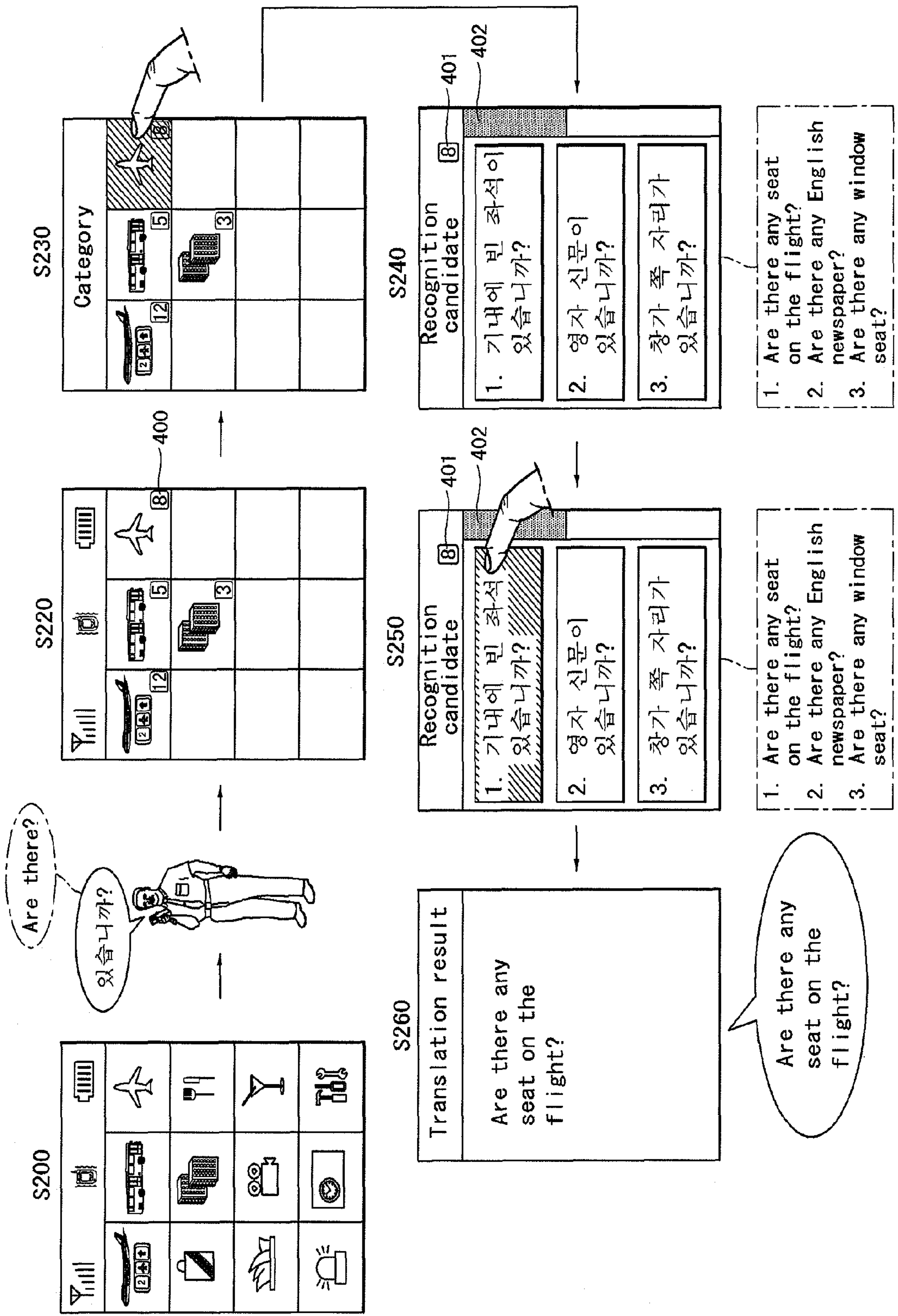
FIG. 5 is a view showing an example of implementing the language translating method according to the second embodiment of the present invention.

FIG. 4 is a flow chart of a method of translating a language using voice recognition according to a second embodiment of the present invention. FIG. 5 is a view showing an example of implementing the language translating method according to the second embodiment of the present invention. The method of translating a language using voice recognition according to the second embodiment of the present invention can be carried out in the language translating apparatus 10 as shown in FIG. 1. Hereinafter, referring to FIGS. 4 and 5, the method of translating a language using voice recognition according to the second embodiment of the present invention and a concrete operation of the language translating apparatus 10 for implementing the method will be described in detail.

First, a voice comprising a first language is inputted through the voice input unit 101 [S200]. Step S200 is identical to step S100 of FIG. 2.

The controller 119 performs voice recognition on the voice input by controlling the voice recognition unit 103 [S210], and outputs at least one category each containing at least one recognition candidate corresponding to the voice input [S220]. For example, in a case where an expression "... (Are there)" is inputted as voice from the user, the controller 119 performs voice recognition and displays, on the touch screen 111 and 113, four categories containing recognition candidates corresponding to "... (Are there)". The four categories displayed in step S220 of FIG. 5 correspond to "airport", "bus", "flight", and "hotel", respectively.

In step S220, the controller 119 may output the number of the at least one recognition candidate contained in each of the at least one category. For example, referring to step S220 of FIG. 5, the numbers of the recognition candidates contained in the outputted categories are displayed. For example, reference numeral 400 represents that there are four recognition candidates containing " . . . (Are there)" in the category corresponding to "flight".

The controller 119 receives a selection signal for one of the at least one category selected in step S230 [240]. For example, as shown in FIG. 5, the controller 119 may display, on the touch screen 111 and 113, recognition candidates contained in "flight" selected by the user. The controller 119 may display on the screen the number 401 of the recognition candidates outputted in step S240. In a case where the recognition candidates outputted in step S240 cannot be displayed on a single screen, as shown in FIG. 5, a scroll area including a scroll bar 402 for scrolling the screen can be provided.

Figure 6:
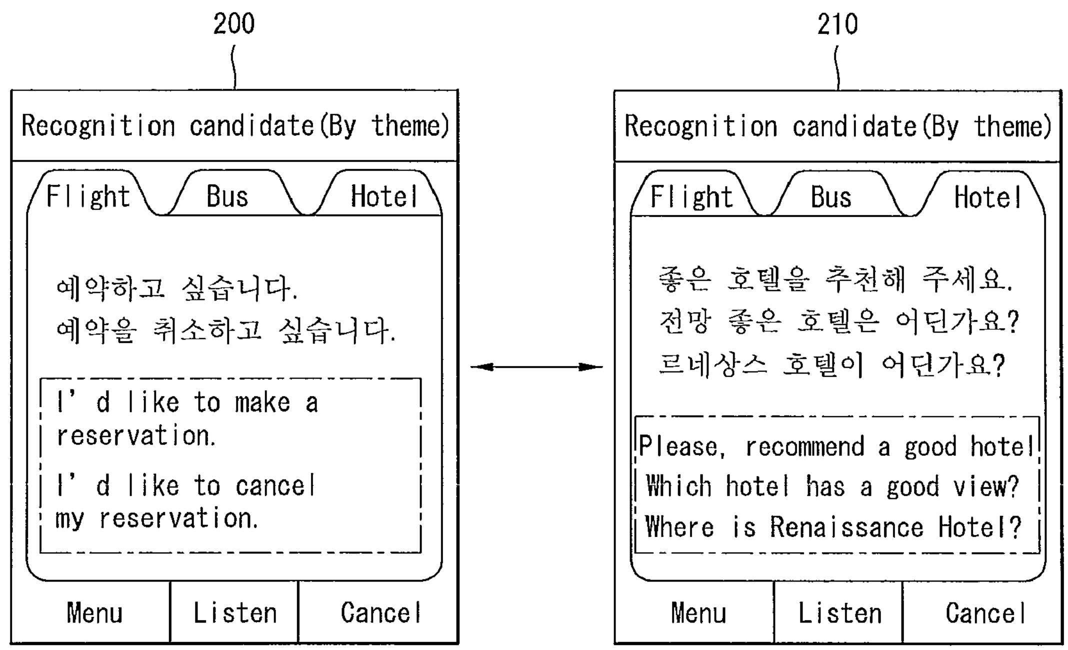
FIG. 6 is a view showing an example of a user interface for access by category.

In step S240, if there exists no recognition candidate desired by the user among the outputted recognition candidates, the display can move directly to other categories without returning to the upper menu. FIG. 6 is a view showing an example of a user interface for access by category. On the screen 200 displaying the recognition candidates contained in "flight" in FIG. 6, the user can access directly to the screen 210 displaying the recognition candidates contained in "hotel" by selecting "hotel". A method in which the user selects a specific category may be various. A specific category may be selected by using a direction key provided in the key input unit 115 and touching a corresponding area on the touch screen 111 and 113.

The controller 119 receives a selection signal for at least one recognition candidate among the recognition candidates outputted in step S240 [S250]. For example, as shown in FIG. 5, the user can select a recognition candidate "1 . . . ?(Are there any seat on the flight?)" among the recognition candidates displayed in step S240.

The controller 119 outputs translation data comprising a second language corresponding to at least one recognition candidate selected in step S250 [S260]. For instance, as shown in FIG. 5, the controller 119 may output a second language (English in FIG. 5) corresponding to the recognition candidate "1 . . . (Are there any seat on the flight?)" selected by the user through the touch screen 111 and 113 and the voice output unit 117.

Figure 7:
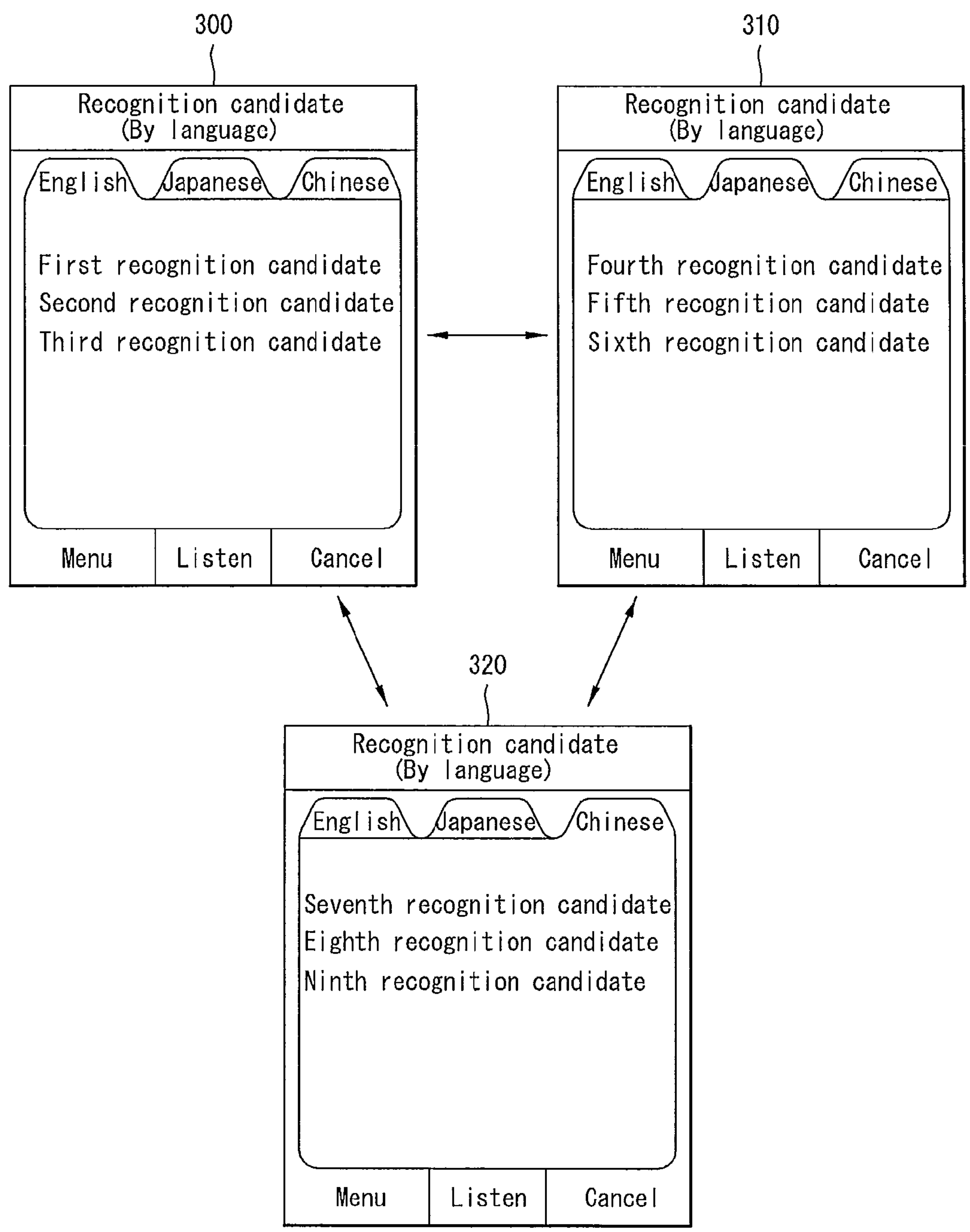
FIG. 7 is a view showing an example of a user interface for providing categories by language.

In the above-described method of translating a language using voice recognition according to the second embodiment of the present invention, categories by language as well as the categories by theme can be provided to the user. FIG. 7 is a view showing an example of a user interface for providing categories by language.

For example, the user interface for providing categories by language can be provided in step S220 or in step S250 in FIG. 4.

In FIG. 7, the user can select a category of a specific language in the same manner as in FIG. 6. For example, in FIG. 7, the "Japanese" category 310 and the "Chinese" category 320 can be selected from the "English" category by a directional key or by touching.

Each of the categories by language may provide recognition candidates comprising a corresponding language. For example, in FIG. 7, the first to third recognition candidates include recognition candidates comprising the English language, the fourth to sixth recognition candidates include recognition candidates comprising the Japanese language, and the seventh to ninth recognition candidates include recognition candidates comprising the Chinese language. Here, recognition candidates corresponding to each other by language may have the same meaning. For instance, the first recognition candidate, fourth recognition candidate, and seventh recognition candidate may comprise different languages and have the same meaning.

<User Interface for Selecting One of Expressions>

Figure 8:
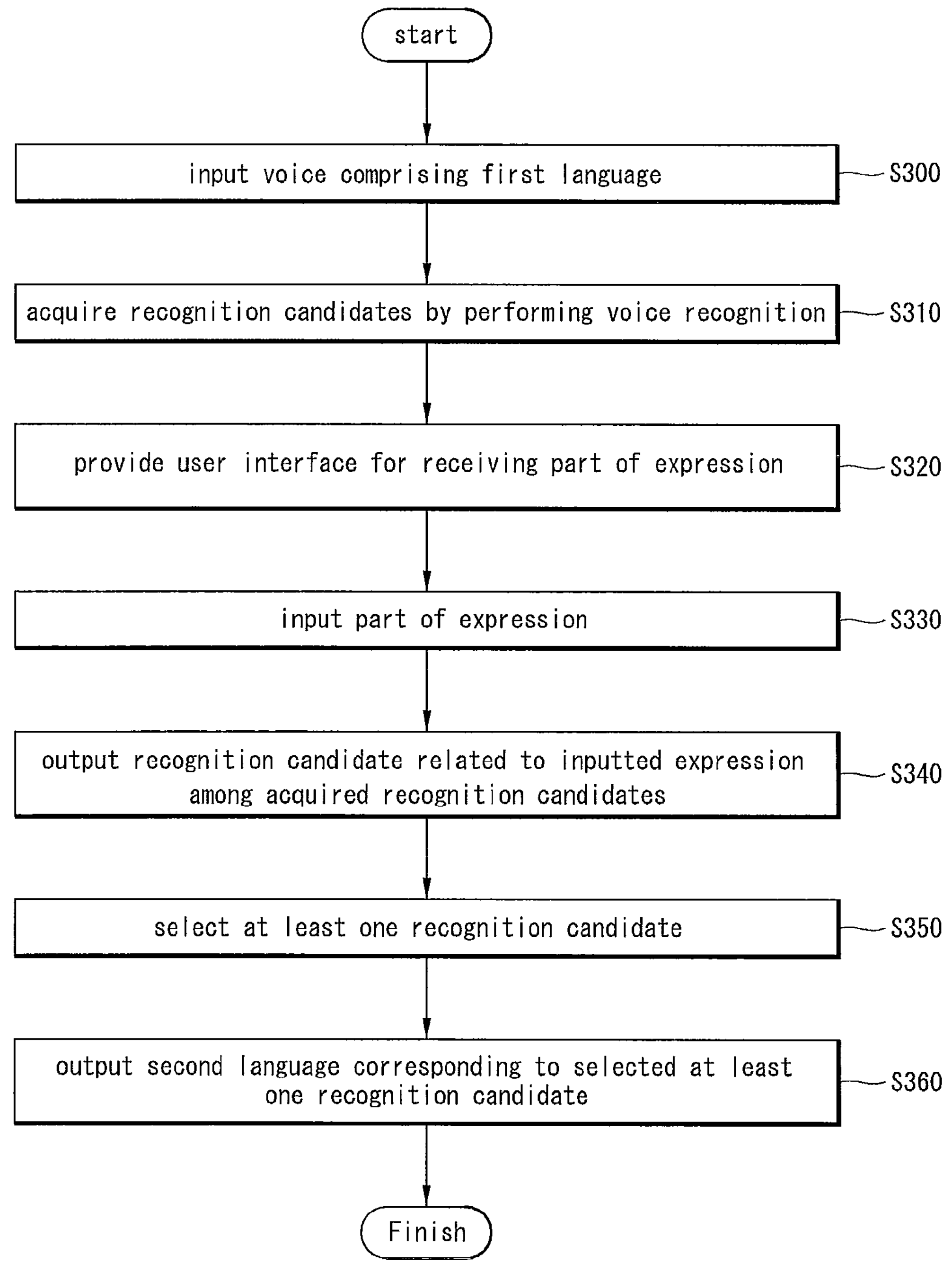
FIG. 8 is a flow chart of a method of translating a language using voice recognition according to a third embodiment of the present invention.
Figure 9:
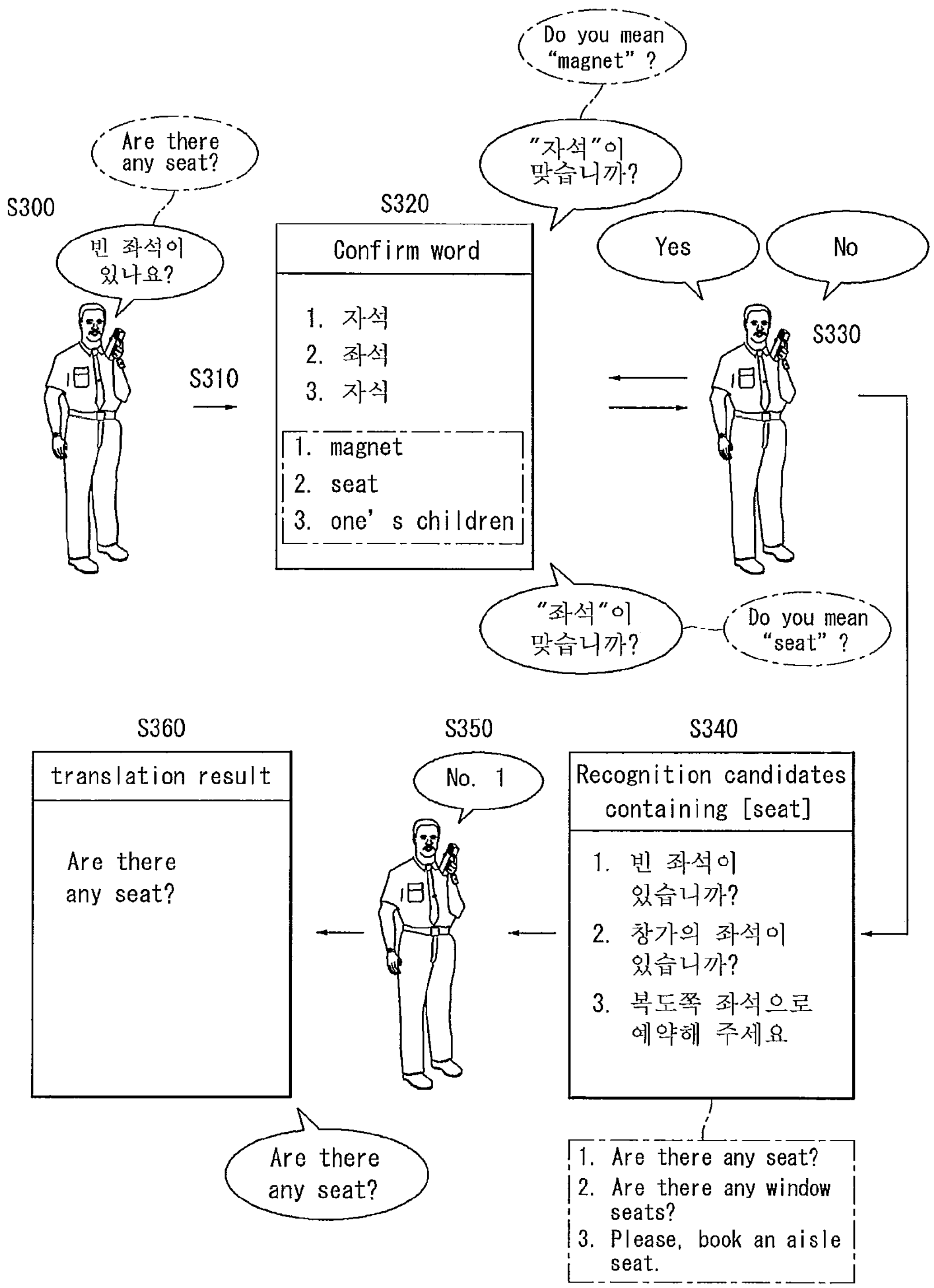
FIG. 9 is a view showing an example for implementing the language translating method according to the third embodiment of the present invention.

FIG. 8 is a flow chart of a method of translating a language using voice recognition according to a third embodiment of the present invention. FIG. 9 is a view showing an example for implementing the language translating method according to the third embodiment of the present invention. The method of translating a language using voice recognition according to the third embodiment of the present invention can be carried out in the language translating apparatus 10 as shown in FIG. 1. Hereinafter, referring to FIGS. 8 and 9, the method of translating a language using voice recognition according to the third embodiment of the present invention and a concrete operation of the language translating apparatus 10 for implementing the method will be described in detail.

First, a voice comprising a first language is inputted through the voice input unit 101 [S300]. Step S300 is identical to step S100 of FIG. 2.

The controller 119 performs voice recognition on the voice input by controlling the voice recognition unit 103 and acquires at least one recognition candidate corresponding to the voice input [S310]. For example, in FIG. 9, the user can input an expression " . . . (Are there any seat?)" through the voice input unit 101. The controller 119 performs voice recognition on the expression " . . . (Are there any seat?)" and acquires at least one recognition candidate. The acquired at least one recognition candidate can be temporarily stored in the memory 109. The acquired at least one recognition candidate may be outputted through the display unit 111 or not. FIG. 9 shows the case in which recognition candidates acquired for a voice " . . . (Are there any seat?)" are not displayed on the display unit 111 but temporarily stored in the memory 109 and managed by the controller 119.

The controller 119 provides a user interface for receiving one of expressions related to the voice input [S320], and receives one of expressions related to the voice input through the provided user interface [S330].

As mentioned in the first embodiment of the present invention, the user interface provided in step S320 is provided to allow the user to quickly and efficiently access his or her desired recognition candidate if there are too many recognition candidates corresponding to the expression spoken in voice by the user. For example, in FIG. 9, as a result that the controller 119 performs voice recognition by controlling the voice recognition unit 103, if the user selects any one of " . . . (seat)", " . . . (magnet)", and " . . . (one's children)", the controller 119 can judge that the number of recognition candidates decrease to a large extent. At this moment, the controller 119 may provide a user interface for receiving one of expressions related to the voice inputted in step S300.

The user interface for receiving one of expressions may be implemented in various forms. As shown in FIG. 9, the user interface may be a user interface using image information and voice information. For example, the controller 119 may display a plurality of expressions to be selected by the user on the touch screen 111 and 113. In addition, for example, the controller 119 may output a voice "' . . . ' . . . ?(Do you mean 'magnet'?)" through the voice output unit 117 by controlling the voice synthesis unit 105. If a voice "No" is inputted from the user, the controller 119 may output a voice "' . . . ' . . . ?(Do you mean 'seat'?)" by the same process. When a voice "Yes" is inputted from the user, an expression " . . . (seat)" is inputted.

Here, the user may input by touching his or her desired expression among the expressions displayed on the touch screen 111 and 113.

The expressions may be ones contained in the voice input or keywords related to the voice input. Regarding what kind of expression the user is to be requested to use, the controller 119 may determine in a way advantageous to reduce the number of recognition candidates. For example, if it is judged that the number of recognition candidates will significantly decrease upon receipt of a correct selection from the user about one of expressions related to the voice inputted from the user, the controller 110 may request the user to confirm one of expressions related to the voice input as shown in FIG. 9.

The controller 119 outputs at least one recognition candidate related to the expression inputted in step S330 among the at least one recognition candidate acquired in step S310 [S340]. For example, as shown in FIG. 9, the recognition candidates containing " . . . (seat)" may be displayed on the touch screen 111 and 113.

The controller 119 receives a selection signal for at least one of the at least one recognition candidates related to the inputted expression [S350]. For example, if the user says "No. 1", a recognition candidate " . . . (Are there any seat?)" can be selected. In addition, for example, if the user touches a specific recognition candidate among the recognition candidates displayed on the touch screen 111 and 113, his or her desired recognition candidate can be selected.

The controller 119 outputs translation data comprising a second language corresponding to the at least one recognition candidate selected in step S350 [S360]. Step S360 corresponds to step S260 of FIG. 4.

<User Interface for Correcting Recognition Candidate>

Figure 10:
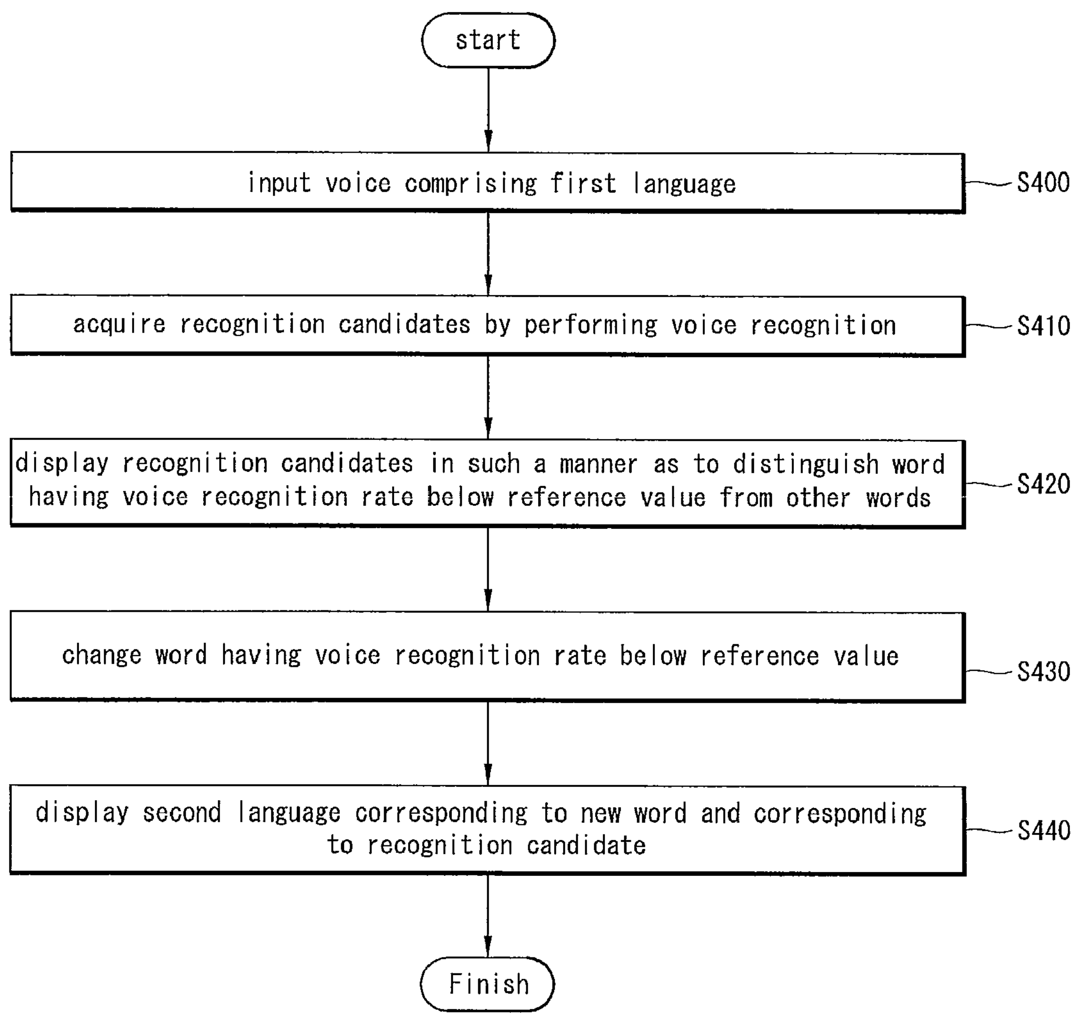
FIG. 10 is a flow chart of a method of translating a language using voice recognition according to a fourth embodiment of the present invention.
Figure 11:
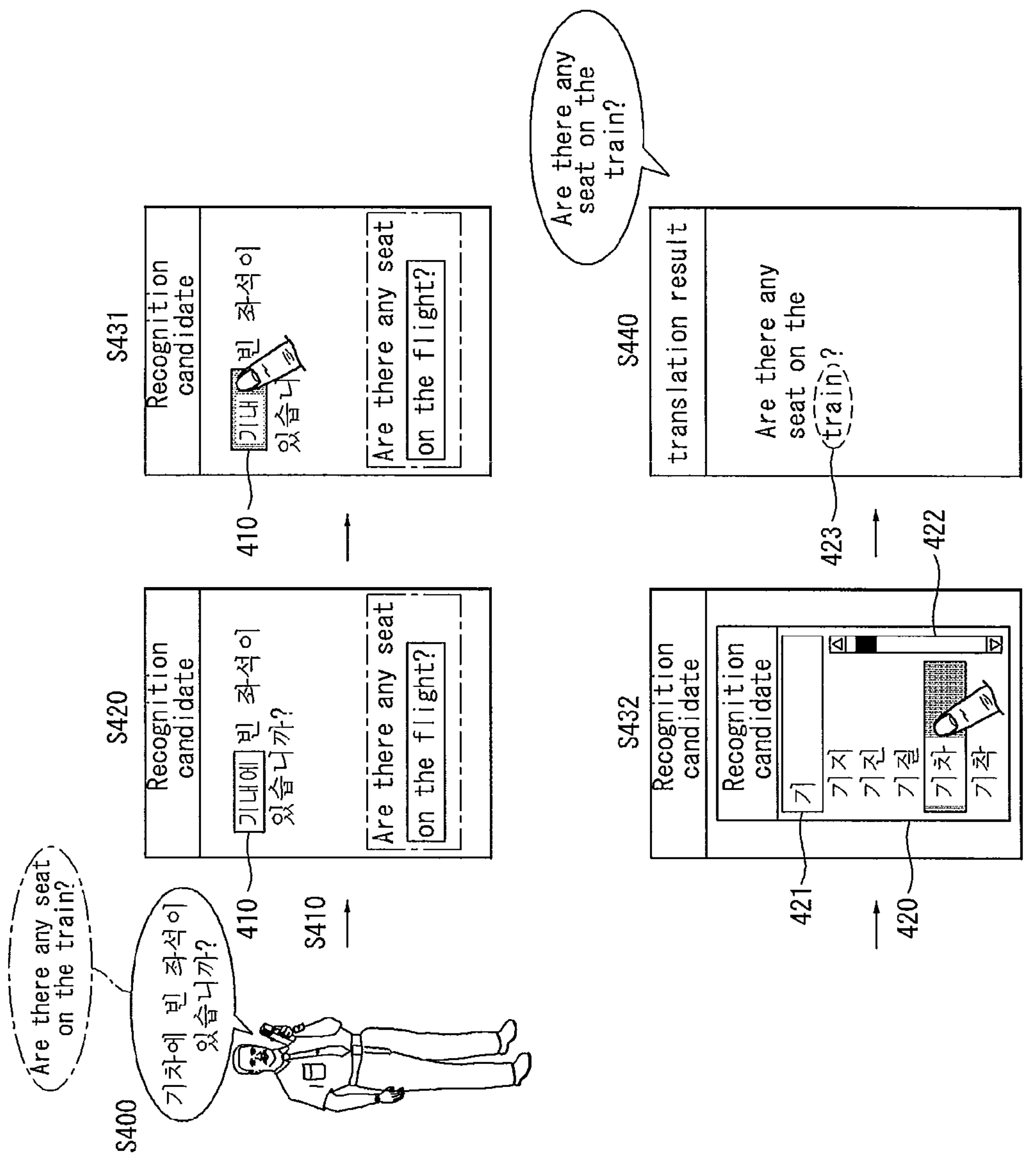
FIG. 11 is a view showing an example for implementing the language translating method according to the fourth embodiment of the present invention.

FIG. 10 is a flow chart of a method of translating a language using voice recognition according to a fourth embodiment of the present invention. FIG. 11 is a view showing an example for implementing the language translating method according to the fourth embodiment of the present invention. The method of translating a language using voice recognition according to the fourth embodiment of the present invention can be carried out in the language translating apparatus 10 as shown in FIG. 1. Hereinafter, referring to FIGS. 10 and 11, the method of translating a language using voice recognition according to the fourth embodiment of the present invention and a concrete operation of the language translating apparatus 10 for implementing the method will be described in detail.

First, a voice comprising a first language is inputted through the voice input unit 101 [S400]. Step S400 is identical to step S100 of FIG. 2. However, a voice inputted in step S400 may contain a plurality of words. For example, in step S400 of FIG. 11, the user speaks a voice " . . . ?(Are there any seat on the train?)". This voice comprises four words, " . . . (on the train)", " . . . (any)", " . . . (seat)", and " . . . ?(are there)".

The words mentioned in the present invention may be one word or a word group comprising more two or more words. For example, the words mentioned in the present invention may be one noun, a word group comprising one noun and one postposition, or a word group comprising one noun and one preposition.

The controller 119 acquires recognition candidates corresponding to the voice input by performing voice recognition by controlling the voice recognition unit 103 [S410]. The voice recognition may be performed in units of words. The recognition dictionary and translation database stored in the memory 109 may have a structure required to perform voice recognition in units of words. For example, in matching a first language and a second language, the translation database may contain both matching information for matching between specific sentences and matching information for each word comprising the specific sentences.

The controller 119 displays the recognition candidates acquired in step S410 on the touch screen 111 and 113 in such a manner as to distinguish a word having a confidence below a reference value among the plurality of words comprising the voice inputted in step S400 from the other words [S420]. For example, in step S420 of FIG. 11, a Korean sentence " . . . ?(Are there any seat on the flight?)", which is a recognition candidate corresponding to the voice inputted in step S400, is displayed. Here, the user actually pronounced " . . . (on the train)", but the confidence for this word is low or there exists no recognition candidate corresponding to " . . . (on the train)" and hence the recognition candidate " . . . (on the flight)" is displayed.

Since a confidence measure algorithm for measuring the confidence of a voice recognition result is a well-known technique, a detailed description thereof will be omitted. This technique related to confidence measurement is called utterance verification.

In step S420, the word having a confidence below a reference value is displayed in a different shape or color from the other words, so that the user can distinguish a word having a low confidence from the other words. For example, in step S420 of FIG. 11, " . . . (on the flight") can be displayed in a rectangular outline 420, or in boldface or italic, or in a different color or font from the other words.

The controller 119 changes the word having a confidence below a reference value into a new word [S430]. Step S430 may comprise steps S431 and S432 to be described later.

If the user selects the word having a confidence below a reference value [S431 of FIG. 11], the controller 119 provides a user interface for changing the word having a confidence below a reference value into a new word, and the user can change the word having a confidence below a reference value into a new word through the user interface [S432 of FIG. 11]. For example, in S432 of FIG. 11, the user is provided with a Korean dictionary or Korean-to-English dictionary 420. The user can select a desired word by searching for a desired Korean word through a search window 421. The dictionary 420 may be stored in the memory 109 or may exist at the outside.

The controller 119 may replace the word having a confidence below a reference value with a second language corresponding to the new word changed in step S430, and display the second language corresponding to the recognition candidate on the touch screen 111 and 113 [S440]. For example, the recognition candidate acquired in step S420 is " . . . ", and the corresponding second language is "Are there any seat on the flight". However, since " . . . (on the flight" is changed into " . . . (on the flight)" in step S430, as shown in step S440 of FIG. 11, the controller 119 changes "flight" in the recognition candidate into "train" 423 in step S440 and outputs "Are there any seat on the train" as a final translation result. An outputting method in step S440 includes at least one of a visual information outputting method and an acoustic information outputting method.

The user may register the final translation result outputted in step S440 in the translation database. If there exists no sentence containing a specific word desired by the user in the translation database, the user can register a new sentence by using the sentences existing in the translation database.

<User Interface for Correcting Translation Results>

Figure 12:
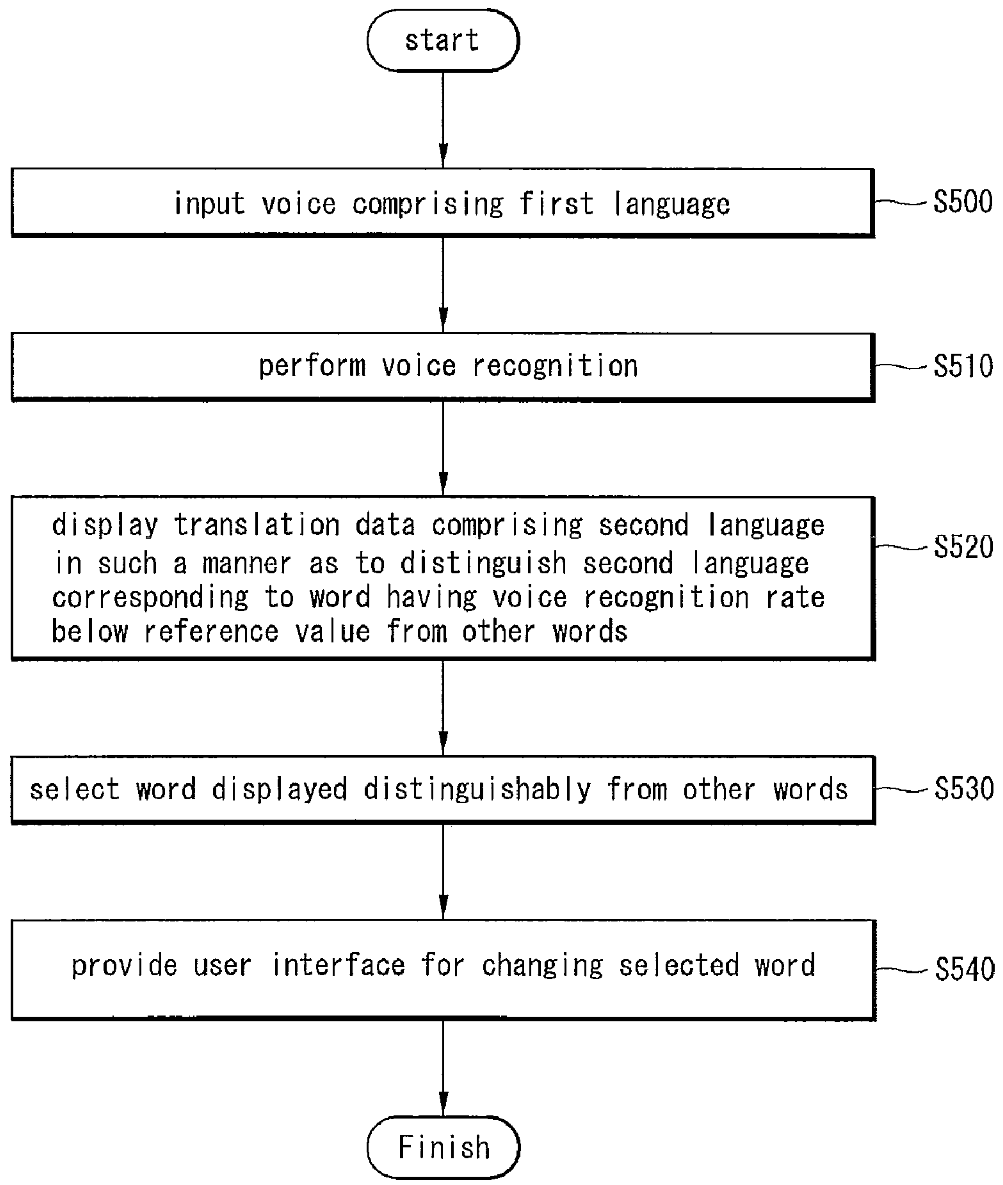
FIG. 12 is a flow chart of a method of translating a language using voice recognition according to a fifth embodiment of the present invention.
Figure 13:
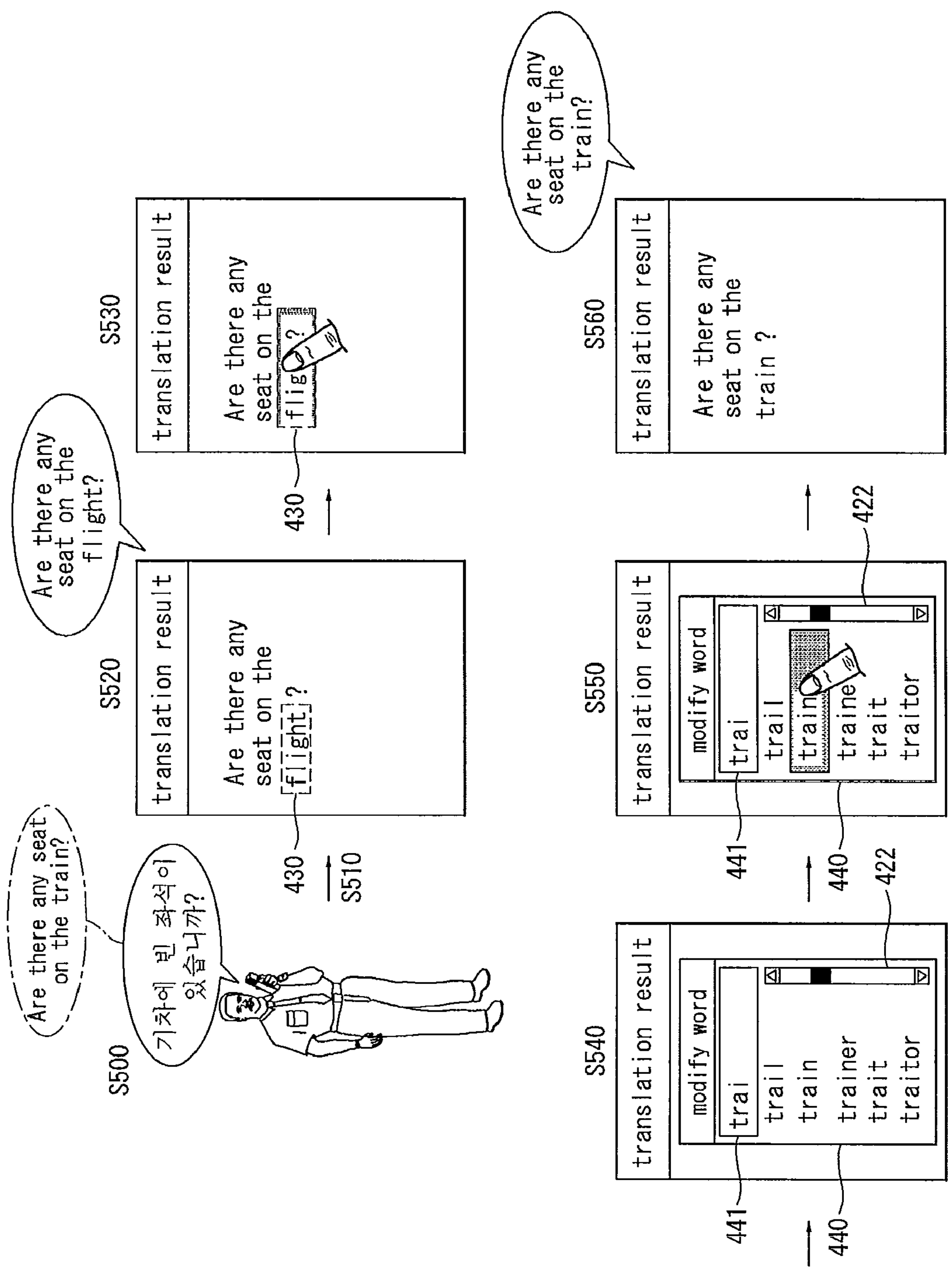
FIG. 13 is a view showing an example for implementing the language translating method according to the fifth embodiment of the present invention.

FIG. 12 is a flow chart of a method of translating a language using voice recognition according to a fifth embodiment of the present invention. FIG. 13 is a view showing an example for implementing the language translating method according to the fifth embodiment of the present invention. The method of translating a language using voice recognition according to the fifth embodiment of the present invention can be carried out in the language translating apparatus 10 as shown in FIG. 1. Hereinafter, referring to FIGS. 12 and 13, the method of translating a language using voice recognition according to the fifth embodiment of the present invention and a concrete operation of the language translating apparatus 10 for implementing the method will be described in detail.

First, a voice comprising a first language is inputted through the voice input unit 101 [S500]. Step S500 is identical to step S100 of FIG. 2. However, a voice inputted in step S500 may contain a plurality of words. For example, in step S500 of FIG. 13, the user speaks a voice " . . . ?(Are there any seat on the train?)". This voice comprises four words, " . . . (on the train)", " . . . (any)", " . . . (seat)", and " . . . ?(are there)".

Here, the words have the same meanings as those described in the fourth embodiment of the present invention.

The controller 119 performs voice recognition on the voice inputted in step S500 [S510], and displays translation data comprising a second language corresponding to the voice input on the touch screen 111 and 113 [S520]. Here, the controller 119 displays the second language corresponding to a word having a confidence below a reference value among the plurality of words in such a manner as to distinguish the word from the other words comprising the translation data. A method of displaying the second language corresponding to the word having a confidence below a reference value is identical to that described in the fourth embodiment. For example, referring to FIG. 13. "flight" corresponding to the word having a confidence below a reference value is displayed in an outline 430.

For example, referring to FIG. 13, when the user pronounces a Korean expression "... ?(Are there any seat on the train?)" [S500], the voice recognition unit 103 recognizes this as "... (Are there any seat on the flight?)" [S510]. Thus, the controller 119 may display "Are there any seat on the flight", which is an English expression corresponding to the recognition result, on the touch screen 111 and 113 [S520].

The user may select a word displayed distinguishably from the other words in step S520 [S530]. For example, in step S530 of FIG. 13, the user may select "flight".

The controller 119 may provide a user interface for changing the selected word according to the performing of step S530 [S540]. For example, referring to step S540 of FIG. 13, the controller 119 may provide an English dictionary or English-to-Korean dictionary 440 for changing "flight" into other English words. The user may search for a desired word through a search window 441 provided in the dictionary 440. Then, the user may select the desired word [S550 of FIG. 13].

In addition, for example, in step S540, the controller 119 may provide a Korean-to-English dictionary for changing "flight" into other English words (not shown). When the user search for a desired Korean word by using a search window provided in the Korean-to-English dictionary.

The controller 119 may output a new translation result, as shown in S560 of FIG. 13 by applying the word selected by the user to the translation result according to the performing of steps S540 and S550.

Like in the fourth embodiment of the present invention, the user may register the new translation result outputted in step S560 in the translation database.

<Management and Cumulative Storage of Translation Result File>

Figure 14:
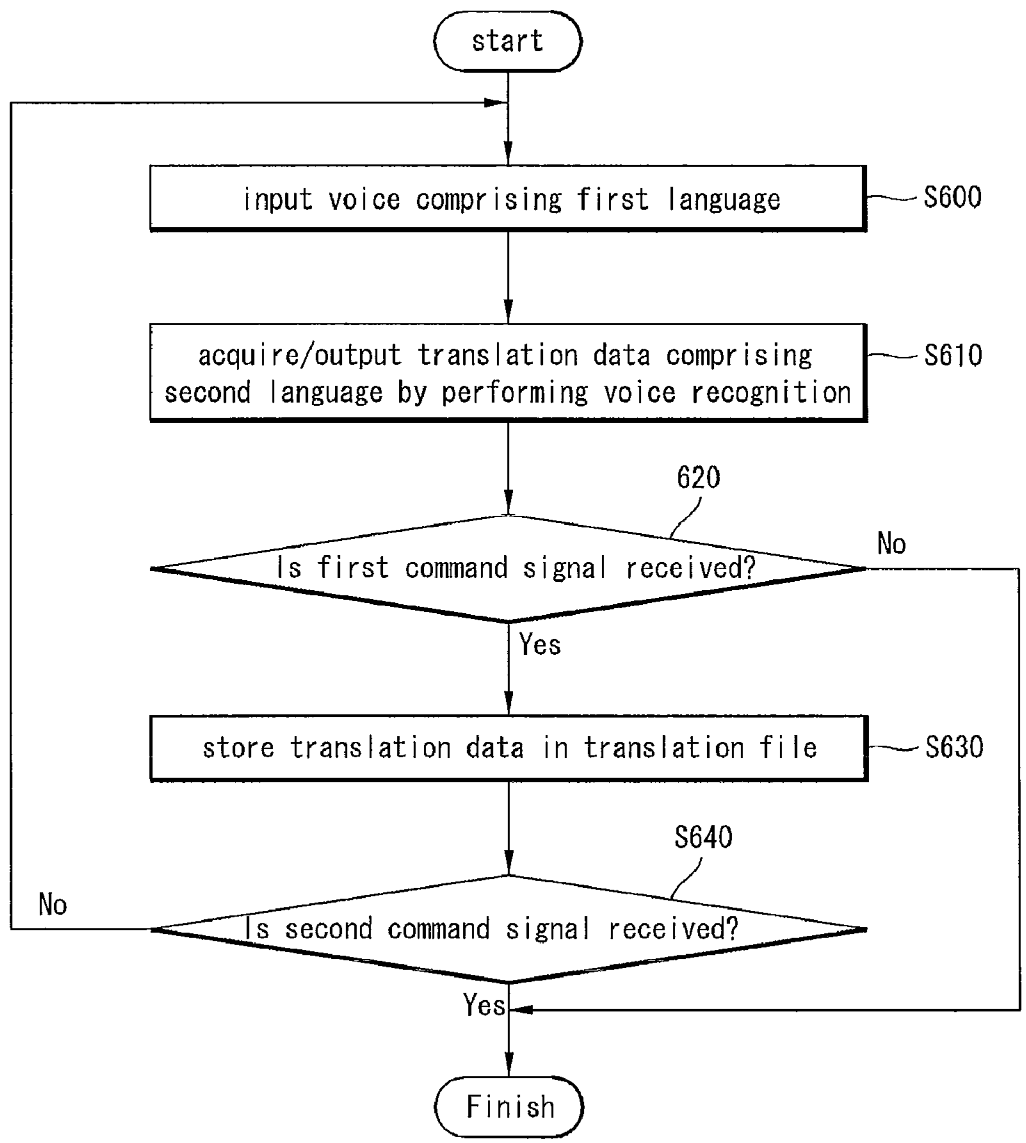
FIG. 14 is a flow chart of a method of translating a language using voice recognition according to a sixth embodiment of the present invention.

FIG. 14 is a flow chart of a method of translating a language using voice recognition according to a sixth embodiment of the present invention. The method of translating a language using voice recognition according to the sixth embodiment of the present invention can be carried out in the language translating apparatus 10 as shown in FIG. 1. Hereinafter, referring to FIG. 14, the method of translating a language using voice recognition according to the sixth embodiment of the present invention and a concrete operation of the language translating apparatus 10 for implementing the method will be described in detail.

First, a voice comprising a first language is inputted through the voice input unit 101 [S600]. Step S600 is identical to step S100 of FIG. 2.

The controller 119 may acquire and output translation data comprising a second language corresponding to the input voice by performing voice recognition on the input voice [S610].

The controller 119 judges whether a first command signal about the storage of the acquired translation data is received or not [S620]. If the first command signal is received, the translation data acquired in step S610 is stored in a specific translation file [S630].

There may be various sources of the first command signal. For example, the controller 119 may receive the first command signal through an input device provided in the language translating apparatus 10. In addition, for example, the controller 119 may receive the first command signal by an internal setup algorithm preset and stored in the memory 109. If the first command signal is transmitted to the controller 119 by the internal setup algorithm, the user does not need to give a direct command to the language translating apparatus 10.

The controller 119 judges whether a second command signal about the completion of the storage of the acquired translation data is received or not [S640], and if the second command signal is received, completes the storage of the translation data.

As a result of the judgment of step S640, if the second command signal is not received, the controller 119 returns to step S600 in order to continuously receive voice from the outside, and repetitively performs steps S600 to S640.

In the sixth embodiment of the present invention, the translation data acquired according to the repetitive performing of steps S600 to S640 may be added and stored in the translation file. Additional storage in the translation file means that, for example, a translation result corresponding to a voice spoken by the user is cumulatively stored in the same translation file.

For example, if the user pronounces "Korean(1)" [S600], "English(1)", which is translation data corresponding to "Korean(1)", is acquired [S610], and stored in the translation file [S630] according to a user command [S620]. Then, the user does not complete the storage of the translation data [S640]. If "Korean(2)" is pronounced [S610], "English(2)", which is translation data corresponding to "Korean(2)", is acquired [S610], and additionally stored [S630] in the translation file according to a user command [S620].

At this moment, the translation file stores both "English (1)" and "English(2)" therein. The translation file may match and store "Korean(1)" and "English(1)" and match and store "Korean(2)" and "English(2)".

By the cumulative storage of translation results according to the embodiment of the present invention, translation results of a plurality of sentences can be managed in a single file, and the single file can be outputted in voice, thereby delivering a lot of meanings to the user.

In the above-described various embodiments, if a specific search result is outputted, the present invention can provide a re-search function in the outputted specific search result. By using the re-search function, the user can efficiently access a desired search result by performing search on the outputted specific search result.

While the various embodiments described above have been focused on a case in which all of operations are achieved in the same language translating apparatus, the present invention is not limited such embodiments. The above-described embodiments can be implemented in a plurality of apparatuses related to language translation. In a typical example, a mobile terminal and a server can be assumed.

<Implementation in System Comprising Mobile Terminal and Server>

Figure 15:
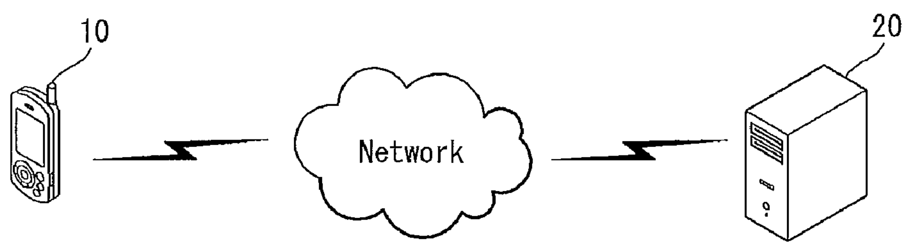
FIG. 15 is a view schematically showing a system to which a method of translating a language using voice recognition according to a seventh embodiment of the present invention is applied.
Figure 16:
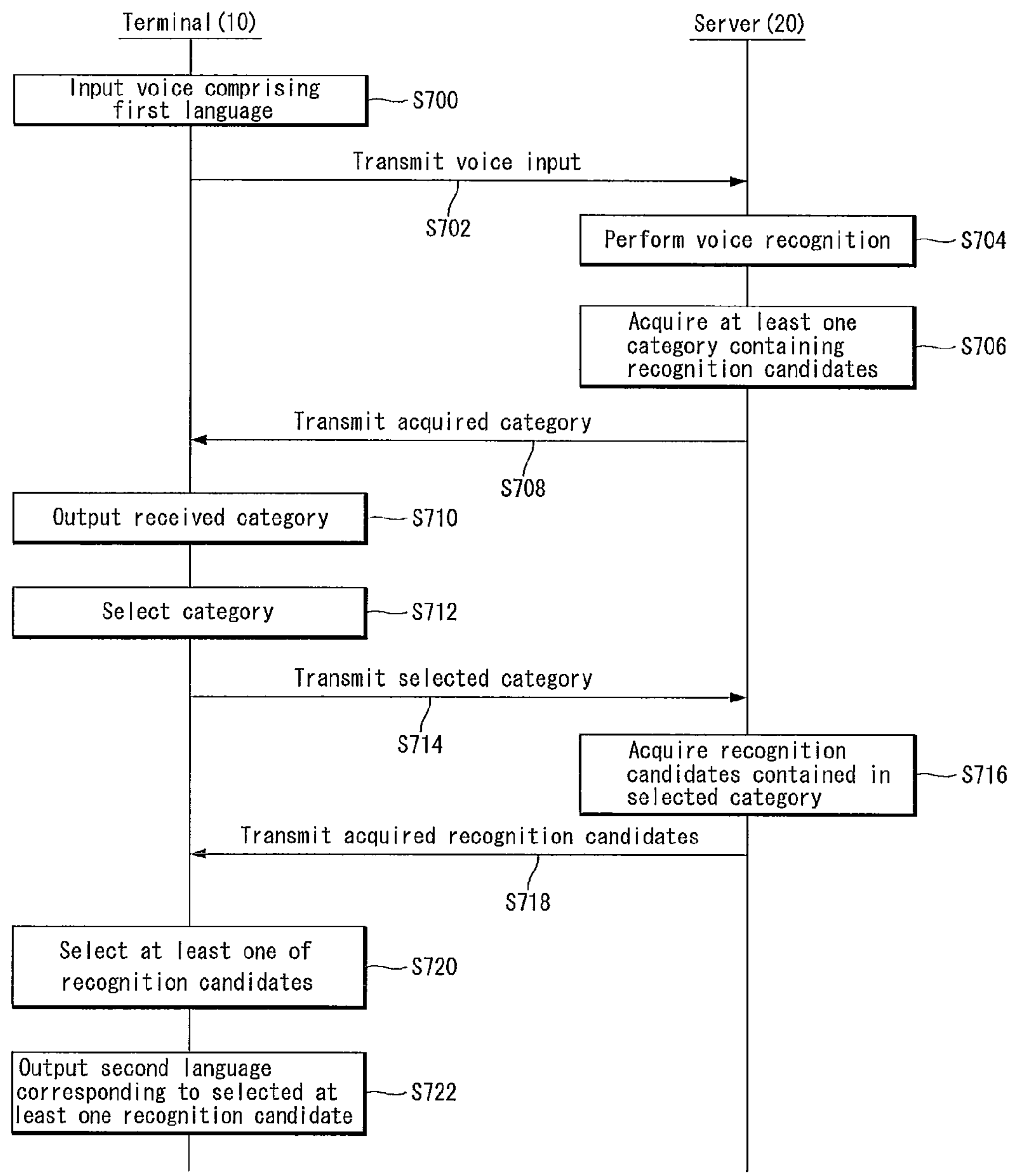
FIG. 16 is a flow chart of a method of translating a language using voice recognition according to the seventh embodiment of the present invention.

FIG. 15 is a view schematically showing a system to which a method of translating a language using voice recognition according to a seventh embodiment of the present invention is applied. FIG. 16 is a flow chart of a method of translating a language using voice recognition according to the seventh embodiment of the present invention. The method of translating a language using voice recognition according to the seventh embodiment of the present invention can be carried out in the system as shown in FIG. 15. Hereinafter, referring to FIGS. 15 and 16, the method of translating a language using voice recognition according to the seventh embodiment of the present invention and a concrete operation of the system for implementing the method will be described in detail.

As shown in FIG. 15, the system for implementing the method of translating a language using voice recognition according to the seventh embodiment of the present invention may comprise a mobile terminal 10 and a server 20 that are connected to each other via a network.

The mobile terminal as shown in FIG. 15 may be the language translating apparatus 10 as shown in FIG. 1. However, the mobile terminal 10 as shown in FIG. 15 may not comprise the voice recognition unit 103 included in the language translating apparatus 10 as shown in FIG. 1. In the case that the mobile terminal 10 as shown in FIG. 15 does not comprise the voice recognition unit 103, the voice recognition unit 103 may be included in the server 20.

The server 20 may store data related to language translation stored in the memory 109 of the language translating apparatus 10 in the foregoing embodiments. For example, the server 20 may store an acoustic model, a recognition dictionary, and a translation database. In addition, the server 20 may store a language model. Details of the acoustic model, recognition dictionary, translation database, and language model are identical to those described above. For example, the translation database may contain a first language and a second language that are matched with each other by category.

Further, the server 20 may comprise the voice recognition unit 103 provided in the language translating apparatus 10 in the foregoing embodiments.

The network as shown in FIG. 15 may be the one conforming to various communication standards. For example, the network may be a wired internet, a wireless internet (WiBRO, WiMAX, etc.), and a wired and wireless integrated internet.

The mobile terminal 10 receives a voice comprising a first language through a voice input unit 101 [S700]. Step 700 is identical to step S200 of FIG. 4.

The mobile terminal 10 transmits the voice input to the server 20 through a communication unit 107 [S702].

The server 20 receives the voice input transmitted from the mobile terminal 10, performs voice recognition on the received voice [S704], and acquires at least one category each comprising at least one recognition candidate corresponding to the received voice [S706]. Each of steps S704 and S706 may correspond to steps S210 and S220 of FIG. 4, respectively.

The server 20 transmits information about the at least one category acquired in step S706 to the mobile terminal 10 [S708]. At this moment, the server 20 may transmit the recognition candidates included in each of the acquired at least one category along with category information, or may transmit only the category information.

The mobile terminal 10 receives information about the at least one category through the communication unit 107 from the server 20, and outputs information about the received at least one category [S710]. Step S710 may correspond to step S220 of FIG. 4. That is, while, in FIG. 4, step S220 is performed in the language translating apparatus 10, step S220 may be performed by using both of the mobile terminal 10 and the server 20 in the seventh embodiment of the present invention.

The mobile terminal 10 receives a selection signal about one of the outputted at least one category [S712]. Step S712 may correspond to step S230 of FIG. 4.

The mobile terminal 10 transmits information about the selected category to the server 20 through the communication unit 107 [S714].

The server 20 receives information about the selected category from the mobile terminal 10, acquires recognition candidates contained in the selected category [S716], and transmits the acquired recognition candidates to the mobile terminal 10 [S718]. Here, the server 20 may transmit the acquired recognition candidates only in the first language, or may transmit the acquired recognition candidates in the first language and the second language corresponding to the acquired recognition candidates.

The mobile terminal 10 receives and outputs the acquired recognition candidates through the communication unit 107 from the server 20, and receives a selection signal for at least one of the outputted recognition candidates [S720].

Step S714, step S718, and step S720 may correspond to step S240 and step S250 of FIG. 4.

The mobile terminal 10 outputs translation data comprising a second language corresponding to the selected at least one recognition candidate [S722]. Step S722 may correspond to step S260 of FIG. 4.

Here, in step S718, in the case that the server 20 has transmitted the recognition candidates only comprising the first language to the mobile terminal 10, the mobile terminal 10 has to request the server 20 for translation data comprising the second language corresponding to the selected at least one recognition candidate. In step S718, in the case that the server 20 has transmitted the recognition candidates comprising the first language and the second language corresponding to the recognition candidates to the mobile terminal 10, the mobile terminal 10 does not have to make a request for a data transmission to the server 20.

The previous seventh embodiment of the present invention has been described with respect to a case where the server 20 comprises both a voice recognition module and a translation-related data. However, the server 20 may comprises translation-related data only, and the voice recognition process may be achieved in the mobile terminal 10 like in the foregoing embodiments. In this case, step S704 may be performed in the mobile terminal 10. To this end, the mobile terminal 10 may comprise the voice recognition unit 103. Further, step S702 may be replaced by the step in which the mobile terminal 10 perform voice recognition and then transmits a result of voice recognition to the server 20.

The above-described method of translating a language using voice recognition according to the present invention can be recorded in a computer-readable recording medium by being prepared as a program for execution in computer.

The method of translating a language using voice recognition according to the present invention can be realized as software. When the present invention is realized as software, components of the present invention are embodied as code segments for executing required operations. A program or the code segments can be stored in a processor readable recording medium and transmitted as computer data signals combined with a carrier using a transmission medium or a communication network.

The computer readable recording medium includes any type of recording device that can store data which can be thereafter read by a computer system. Examples of the computer readable recording medium also include read-only memory (ROM), random-access memory (RAM), CD-ROMs, DVD±ROMs, magnetic tapes, floppy disks, hard disks, optical data storage devices, and so forth. The computer readable recording medium can also be distributed over network coupled computer systems so that the computer readable code is stored and executed in a distributed fashion.

One advantage of the present invention is to provide a method and apparatus of translating a language using voice recognition which can efficiently provide a translation result of a language a user speaks.

Another advantage of the present invention is to provide a method and apparatus of translating a language according to the present invention, which allows a user to be easily and quickly provided with a desired language translation result by providing different user interfaces in accordance with a result of voice recognition on a voice inputted from the user.

Still another advantage of the present invention is to provide a method and apparatus of translating a language according to the present invention, which allows a user to be easily provided with a desired language translation result by providing a user interface capable of correcting a translation result obtained as a result of performing voice recognition on the user's voice.

Those skilled in the art will appreciate that various substitutions, modifications and changes are possible, without departing from the technical spirit of the present invention. Thus, the present invention is not limited to the details of the aforementioned embodiments and the accompanying drawings.

What is claimed is:

1. A method of translating a language using voice recognition, the method comprising:

receiving a voice input comprising a first language;

acquiring at least one recognition candidate corresponding to the voice input by performing voice recognition on the voice input;

providing a plurality of user interfaces comprising at least a first user interface and a second user interface for selecting at least one of the acquired at least one recognition candidate, wherein the first user interface is provided for a first selection to decrease the acquired at least one recognition candidate, wherein the second user interface is generated based on a result of the first selection and is provided for a second selection; and outputting a second language corresponding to the second selection regarding the at least one recognition candidate, wherein a type of the first user interface is determined according to the number of the acquired at least one recognition candidate.

2. The method of claim 1, wherein the acquisition of at least one recognition candidate and the outputting of a second language are performed with reference to a database in which the first language and the second language are matched with each other for each of a plurality of categories.

3. The method of claim 2, wherein, in the provision of the first user interface, if the number of the at least one recognition candidate is more than a reference value, the first user interface is for selecting the categories.

4. The method of claim 1, wherein, in the provision of the first user interface, if the number of the at least one recognition candidate is more than a reference value, the first user interface is for selecting an expression included in the voice input.

5. The method of claim 1, wherein the plurality of user interfaces are provided in graphics or audio.

6. An apparatus of translating a language using voice recognition, the apparatus comprising:

a voice input unit for receiving a voice input comprising a first language;

a voice recognition unit for acquiring at least one recognition candidate corresponding to the voice input by performing voice recognition on the voice input;

a memory storing a plurality of user interfaces comprising a first user interface and a second user interface for selecting at least one of the acquired at least one recognition candidate and a database in which the first and second languages are matched with each other for each of a plurality of categories; and a controller configured to:

provide the first user interfaces for a first selection to decrease the acquired at least one recognition candidate, provide the second user interface for a second selection based on a result of the first selection, wherein a type of the first user interface is determined according to the number of the acquired at least one recognition candidate, receive the second selection signal for at least one of the acquired at least one recognition candidate through the provided second user interface, and output translation data comprising the second language corresponding to the selected at least one recognition candidate with reference to the database.

7. The apparatus of claim 6, wherein, if the number of the at least one recognition candidate is more than a reference value, the controller provides the first user interface for selecting a category.

8. The apparatus of claim 6, wherein, if the number of the at least one recognition candidate is more than a reference value, the controller provides the first interface for selecting one of expressions contained in the voice input.

9. The apparatus of claim 6, wherein the plurality of user interfaces are provided in at least one of graphics and audio.

10. The apparatus of claim 6, wherein the controller outputs the second language in the form of at least one of visual information and voice information.

11. The apparatus of claim 10, further comprising a voice synthesis unit for synthesizing the second language into voice, wherein, if the second language is outputted in the form of the voice information, the controller synthesizes the second language into voice and outputs the same by controlling the voice synthesis unit.

* * * * *